United States Patent [19]
Klassen et al.

[11] Patent Number: 5,767,870
[45] Date of Patent: Jun. 16, 1998

[54] EDGE INSENSITIVE PIXEL DELETION METHOD FOR PRINTING HIGH RESOLUTION IMAGE

[75] Inventors: R. Victor Klassen, Webster; Thomas P. Courtney, Fairport; Stephen C. Morgana, Brockport, all of N.Y.

[73] Assignee: Xerox Corporation, Stamford, Conn.

[21] Appl. No.: 368,137

[22] Filed: Jan. 3, 1995

[51] Int. Cl.⁶ .................... B41J 29/38; B41J 2/01
[52] U.S. Cl. ............................ 347/9; 347/107
[58] Field of Search ................ 347/15, 9, 41, 347/5, 12, 40; 358/296, 298, 300, 302, 400, 456–466; 382/298, 299; 395/109, 112, 128, 117

[56] References Cited

U.S. PATENT DOCUMENTS

| | | | |
|---|---|---|---|
| 4,437,122 | 3/1984 | Walsh et al. | 348/625 |
| 4,629,342 | 12/1986 | Futaki | 400/124.07 |
| 4,774,530 | 9/1988 | Hawkins | 347/63 |
| 4,967,203 | 10/1990 | Doan et al. | 347/41 |
| 5,029,108 | 7/1991 | Lung | 395/109 |
| 5,270,728 | 12/1993 | Lund et al. | 347/5 |
| 5,353,387 | 10/1994 | Petschik et al. | 347/15 |
| 5,359,355 | 10/1994 | Nagoshi et al. | 347/9 |
| 5,374,943 | 12/1994 | Lehmann et al. | 347/9 |
| 5,469,198 | 11/1995 | Kadonaga | 347/41 |
| 5,480,240 | 1/1996 | Bolash | 347/5 |
| 5,677,714 | 10/1997 | Klassen et al. | 347/9 |
| 5,719,601 | 2/1998 | Moore et al. | 347/9 |

FOREIGN PATENT DOCUMENTS

| | | |
|---|---|---|
| 0 317 140 A | 5/1989 | European Pat. Off. |
| 0 622 758 A | 11/1994 | European Pat. Off. |
| 0 623 473 A | 11/1994 | European Pat. Off. |

*Primary Examiner*—Benjamin R. Fuller
*Assistant Examiner*—L. Anderson
*Attorney, Agent, or Firm*—Oliff & Berridge, PLC

[57] ABSTRACT

To print an image having a 600 dpi resolution along the horizontal axis with an ink jet printer that has a 300 dpi resolution, the method alternately examines the odd and even numbered pixel rows of the image. Odd-numbered rows are examined in a left-to-right manner while even-numbered rows are examined in a right-to-left manner. In odd-numbered rows the even numbered pixels are deleted. In the even-numbered rows, the even numbered pixels are deleted starting from the right-most pixel. After deleting the respective pixels, ink drops are fired from the ink jet printer at areas corresponding to the remaining ON pixels. This visibly reproduces the image at the 600 dpi resolution.

20 Claims, 8 Drawing Sheets

PRIOR ART

EDGE INSENSITIVE PIXEL DELETION METHOD FOR PRINTING HIGH RESOLUTION IMAGE

BACKGROUND OF THE INVENTION

1. Field of the Invention

This invention relates to ink jet printers and more particularly, to a method of altering a high resolution pixel image to produce a pixel image that is capable of being visibly reproduced by an ink jet printer having a lower resolution.

2. Description of Related Art

An ink jet printhead selectively ejects droplets of ink from a plurality of drop ejectors to create a desired image on an image receiving medium, such as paper. The printhead typically comprises an array of drop ejectors that convey ink to the image receiving medium. In a carriage-type ink jet printhead, the printhead moves back and forth relative to the image receiving medium to print the images in swaths.

The ink jet printhead typically comprises a plurality of ink passageways, such as capillary channels. Each channel has a nozzle end and is connected to an ink supply manifold. Ink from the manifold is retained within each channel until, in response to an appropriate signal applied to a resistive heating element in that channel, the ink in a portion of the channel adjacent to the heating element is rapidly heated and vaporized. Rapid vaporization of some of the ink from the channel creates a bubble that causes a quantity of ink (i.e., an ink droplet) to be ejected through the nozzle to the image receiving medium. U.S. Pat. No. 4,774,530 to Hawkins, the disclosure of which is incorporated herein by reference, shows a general configuration of a typical ink jet printer.

Many commercially available ink jet printers have a 300 dots per inch (dpi) resolution along the horizontal axis (also called the raster scan axis). Ink jet printers also typically have a 300 dpi vertical resolution so as to form round individual ink droplets that form the pixel images on the paper. These ink jet printers are therefore designed to print 300 dpi by 300 dpi output images. However, increased resolution is desired to print higher resolution images. For example, it may be desirable to print a 300 dpi by 600 dpi pixel image using a 300 dpi ink jet printhead. The effective resolution of an ink jet printer can be increased along the horizontal axis (or raster scan axis) by energizing or firing the ink jets at a higher rate. This requires redesigning the ink jet firing head and therefore results in a substantially higher cost. It is also possible to increase the effective resolution along the raster scan axis by slowing down the rate at which the printhead moves across the paper. However, this results in excessive ink being deposited on the paper due to excessive ink drop overlap.

U.S. Pat. No. 5,270,728 to Lund et al., the disclosure of which is incorporated herein by reference, discloses a method for multiplying the speed resolution of a raster scanning device such as an ink jet printer. A 300 dpi×600 dpi pixel image is mapped to a corresponding, non-overlapping physical dot image and the ink jets are fired responsive to the dot image to direct ink droplets onto the paper at 600 dpi resolution grid timing to effectively double the horizontal resolution of the pixel image. This is done without increasing the firing rate of the printhead.

U.S. Pat. No. 5,270,728 describes thinning the pixel image before it is printed by selectively turning off pixels within the pixel image by referencing the edges of the pixel image. More specifically, U.S. Pat. No. 5,270,728 describes a method of maintaining selected ones of the pixels in an ON state based on ON pixel adjacency and edge proximity criteria.

FIG. 1 shows a pixel image 200 that is desired to be printed by the ink jet printer. In FIG. 1, each pixel is represented by a corresponding rectangle having a 300 dpi vertical and horizontal resolution. For ease of illustration, each row is consecutively numbered 9, 10, 11, 12, 13, 14, 15 and 16. Each of the columns of the pixel image 200 is labelled with a corresponding letter A, B, C, D, E, F, G and H. The columns extend in the raster scanning (or horizontal) direction X. The rows extend in the slow scan (or vertical) direction Y. As an example, the pixel in the upper left hand corner of the pixel image 200 is labelled as pixel 9A. Similarly, the pixel in the bottom right hand corner is labelled as pixel 16H.

FIG. 2 shows an altered pixel image 210 according to the method described in U.S. Pat. No. 5,270,728. As can be seen by FIG. 2, selected pixels are turned OFF so that no two adjacent pixels are maintained ON. Furthermore, the left hand edge (column A) is always maintained in an ON state. Furthermore, the second to last pixel in each of the respective rows is always maintained ON while turning OFF the last pixel in each row. For example, pixel 9D is maintained ON while pixel 9E is turned OFF. Thus, the method described in U.S. Pat. No. 5,270,728 is concerned with determining the proximity (or closeness) of a pixel to an edge of a pixel row.

As can be seen by FIG. 2, the method of U.S. Pat. No. 5,270,728 results in all the pixels in column B being turned OFF. This is primarily because the left hand edge (i.e., column A) of the pixel image 200 is defined by a straight edge. The OFF pixels in column B can lead to visual problems (such as visual texture) when the altered pixel image 210 is mapped and printed according to the method described by U.S. Pat. No. 5,270,728.

FIG. 3 shows a mapping process described in U.S. Pat. No. 5,270,728 whereby each pixel that was maintained ON during the altering step (i.e., following FIG. 2) is subsequently mapped with an OFF pixel to its immediate right. For example, dot 60 corresponds to ON pixel 9A and OFF pixel 9B. The resulting dot structure represents the 300 dpi resolution of the printhead. Thus, the altered pixel image 210 described in FIG. 2 is mapped so that each ON pixel is mapped to a dot 60 with a corresponding OFF pixel to its immediate right. The dot structure of FIG. 3 is then raster scanned by the ink jet printer to print the pixel image.

U.S. Pat. No. 5,270,728 suffers from several problems that effect the visual quality of the resulting image on the copy sheet. For example, when all the pixels in a respective column are turned OFF such as in column B of FIG. 2, visual texture problems may result on the copy sheet. Rows 9 and 10 also illustrate additional problems caused by rows having five pixels. When two or more pixel rows of a five pixel width are vertically aligned, visible white gaps may occur down the centers of the rows. This is illustrated by pixels 9C and 10C in FIG. 3. That is, by using the method of U.S. Pat. No. 5,270,728, contiguous regions of two OFF pixels may occur within a row resulting in visual defects of the resulting image on the copy sheet. These problems occur in part because the method described in U.S. Pat. No. 5,270,728 relies on edge proximity criteria to determine how close respective pixels are to an edge. While it may sometimes be desirable to be sensitive to the edge, this results in a complicated method that requires the numerous pixels within each row to be examined before each pixel is appropriately maintained ON or turned OFF.

SUMMARY OF THE INVENTION

To solve these and other problems, this invention provides a method of increasing the effective resolution of a printhead without the need for edge proximity criteria. This invention therefore provides a much simpler method than that described in U.S. Pat. No. 5,270,728 and accordingly results in an easier to implement method.

This invention also provides a method of printing an image having a defined resolution along a given axis using an ink jet printer that has a predetermined resolution less than the defined resolution of the image. Each row is respectively numbered as odd or even. Pixels within contiguous blocks of black (ON) pixels in each row are then appropriately numbered, beginning at an edge of each contiguous block. Even-numbered pixels are deleted from odd-numbered pixel rows starting with the left-most pixel in each block. In even-numbered rows, the even-numbered pixels are deleted starting from the right-most pixel and proceeding to the left. Subsequently, the ink jet printer fires ink drops at areas corresponding to the remaining ON pixels in the resulting image. This visibly reproduces the pixel image at the defined resolution. The apparent jaggedness, or "zipper-like" appearance of a vertical edge in the bitmap image is smoothed out by interactions between the ink and paper.

Other objects, advantages and salient features of the invention will become apparent from the following detailed description taken in conjunction with the annexed drawings, which disclosed preferred embodiments of the invention.

BRIEF DESCRIPTION OF DRAWINGS

The invention will be described with reference to the following drawings in which like reference numerals refer to like elements and wherein.

DETAILED DESCRIPTION OF PREFERRED EMBODIMENTS

Figure 7:
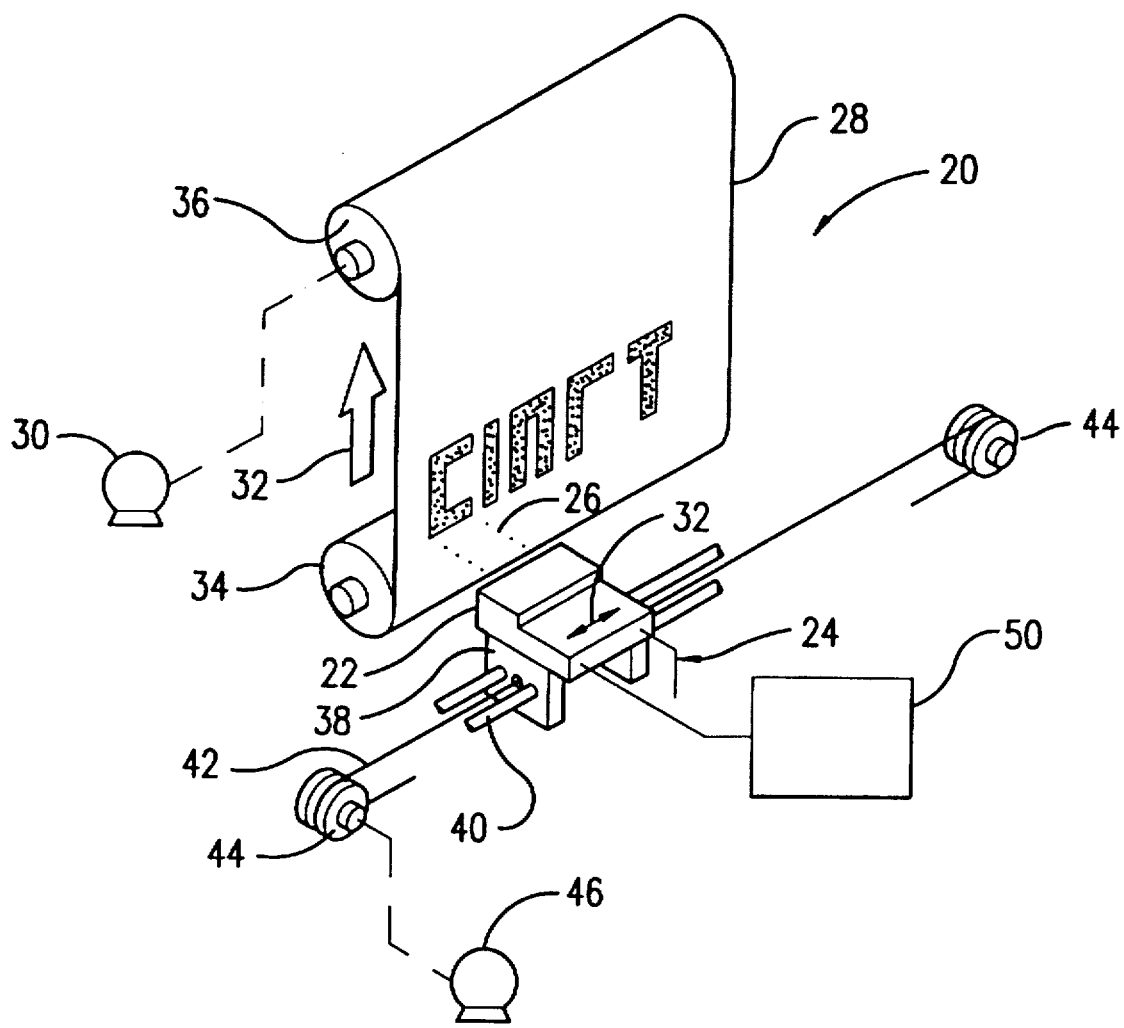
FIG. 7 is a schematic view of an ink jet printing system.

FIG. 7 shows a carriage-type ink jet printing device 20. A linear array of droplet-producing channels is housed in the printhead 22 of a reciprocal carriage assembly 24. Ink droplets 26 are propelled to a receiving medium 28 that is stepped by a motor 30 a preselected distance in the direction of arrow 32 each time the printhead 22 traverses across the receiving medium 28 in the direction indicated by arrow 32. The receiving medium 28, such as paper, can be stored on the supply roll 34 and stacked onto a take-up roll 36 by a stepper motor 30 or other means well known in the art.

The printhead 22 is fixedly mounted on the support base 38, which is adapted for reciprocal movement using any well known means such as the two parallel guide rails 40. The reciprocal movement of the printhead 22 may be achieved by a cable 42 and a pair of rotatable pulleys 44, one of which is powered by a reversible motor 46. The printhead 22 is generally moved across the receiving medium 28 perpendicularly to the direction the receiving medium 28 is moved by the motor 30. Of course, other structures for reciprocating the carriage assembly 24 are also known within the art.

The printhead 22 may also be connected to a controller 50 that will be used with embodiments of the present invention to receive a pixel image at a resolution greater than that of the printhead 22. For example, the received pixel image may be a 300×600 dpi image while the printhead has a 300 dpi resolution. Other resolutions are also within the scope of this invention. The controller 50 may include hardware or software to carry out the present invention as will be described below. Further, it is understood that the above description of the ink jet printing device 20 is merely illustrative and is not limiting. That is, other structures are also within the scope of this invention.

Figure 1:
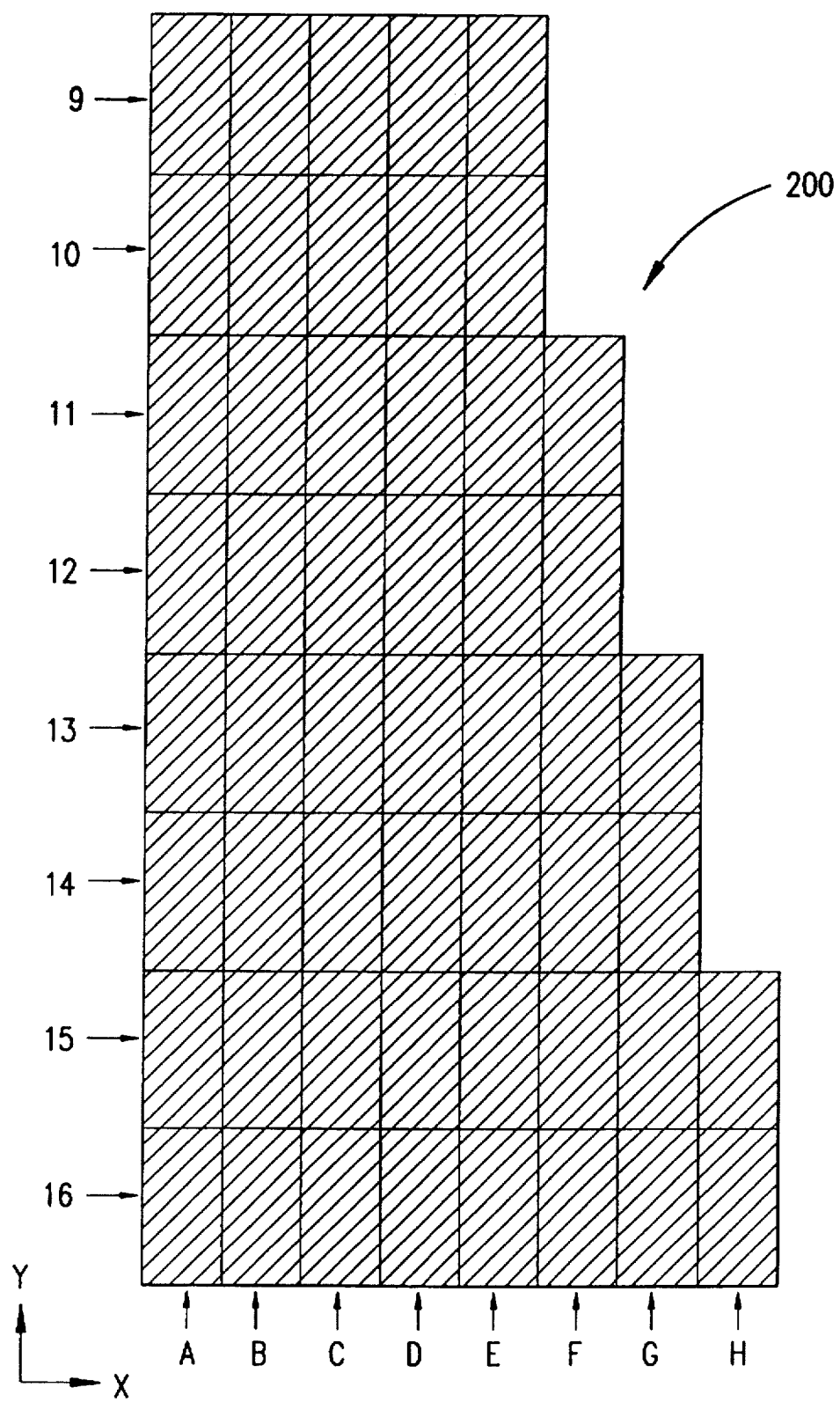
FIG. 1 is a pixel image desired to be printed.
Figure 2:
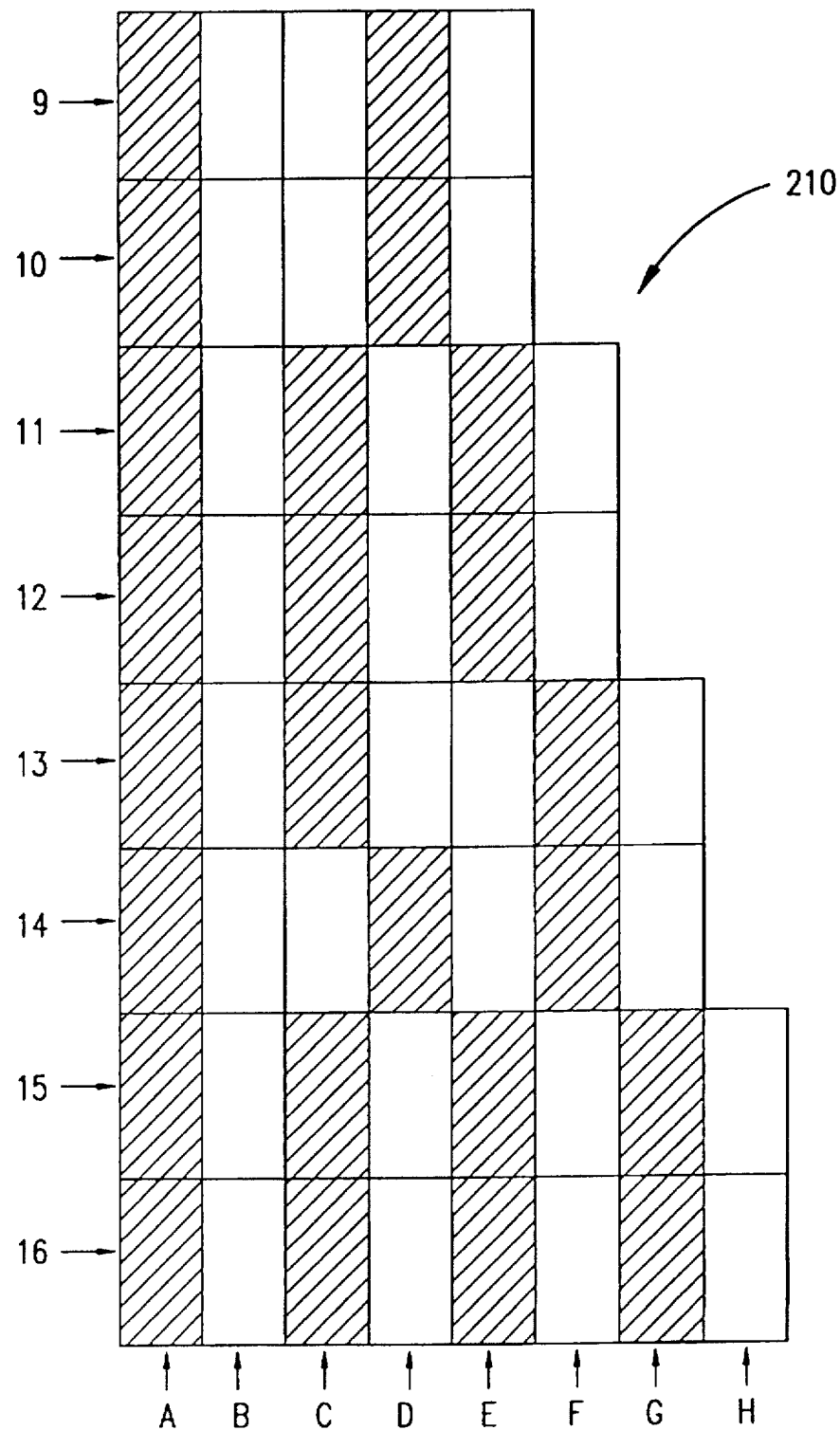
FIG. 2 is an altered pixel image according to a method described in U.S. Pat. No. 5,270,728.
Figure 3:
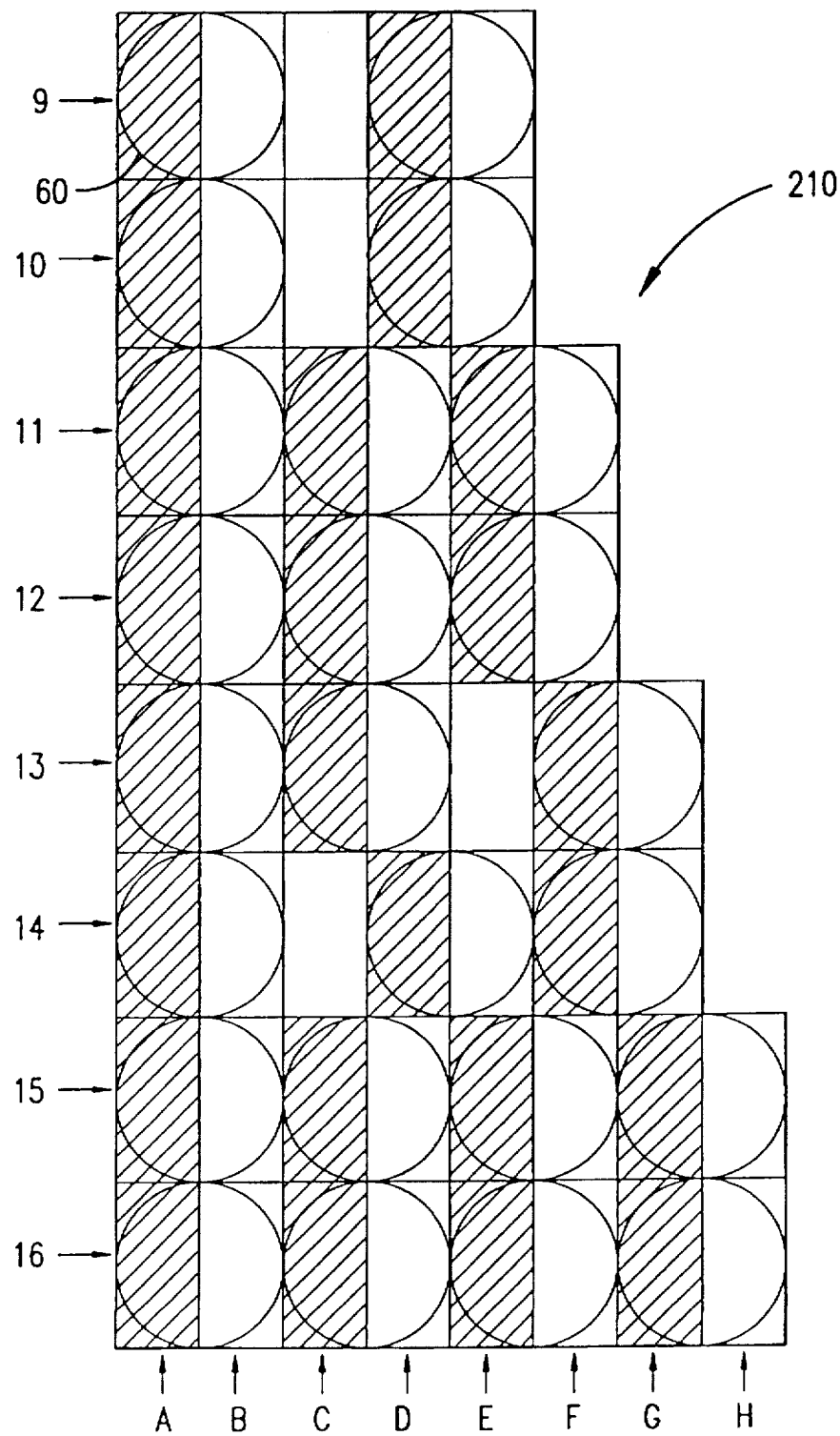
FIG. 3 is a mapped dot structure according to a method described in U.S. Pat. No. 5,270,728.
Figure 4:
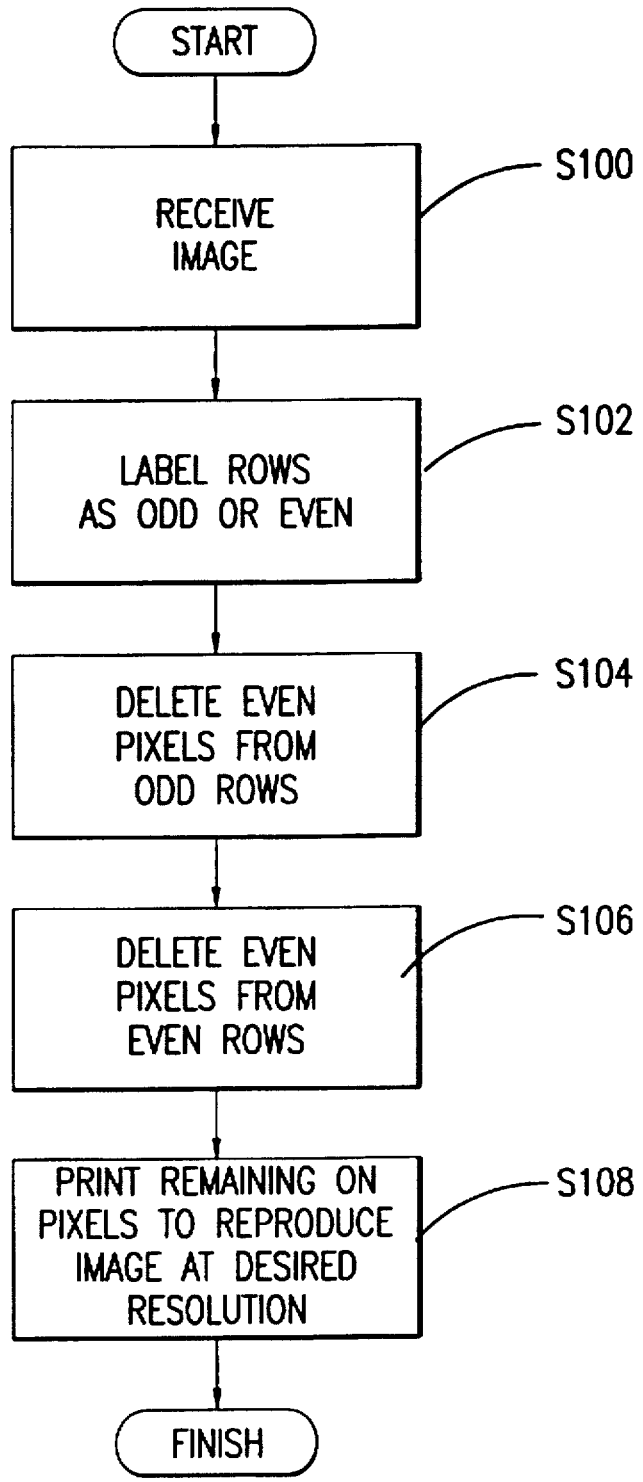
FIG. 4 is a flowchart describing an embodiment of the present invention.
Figure 5:
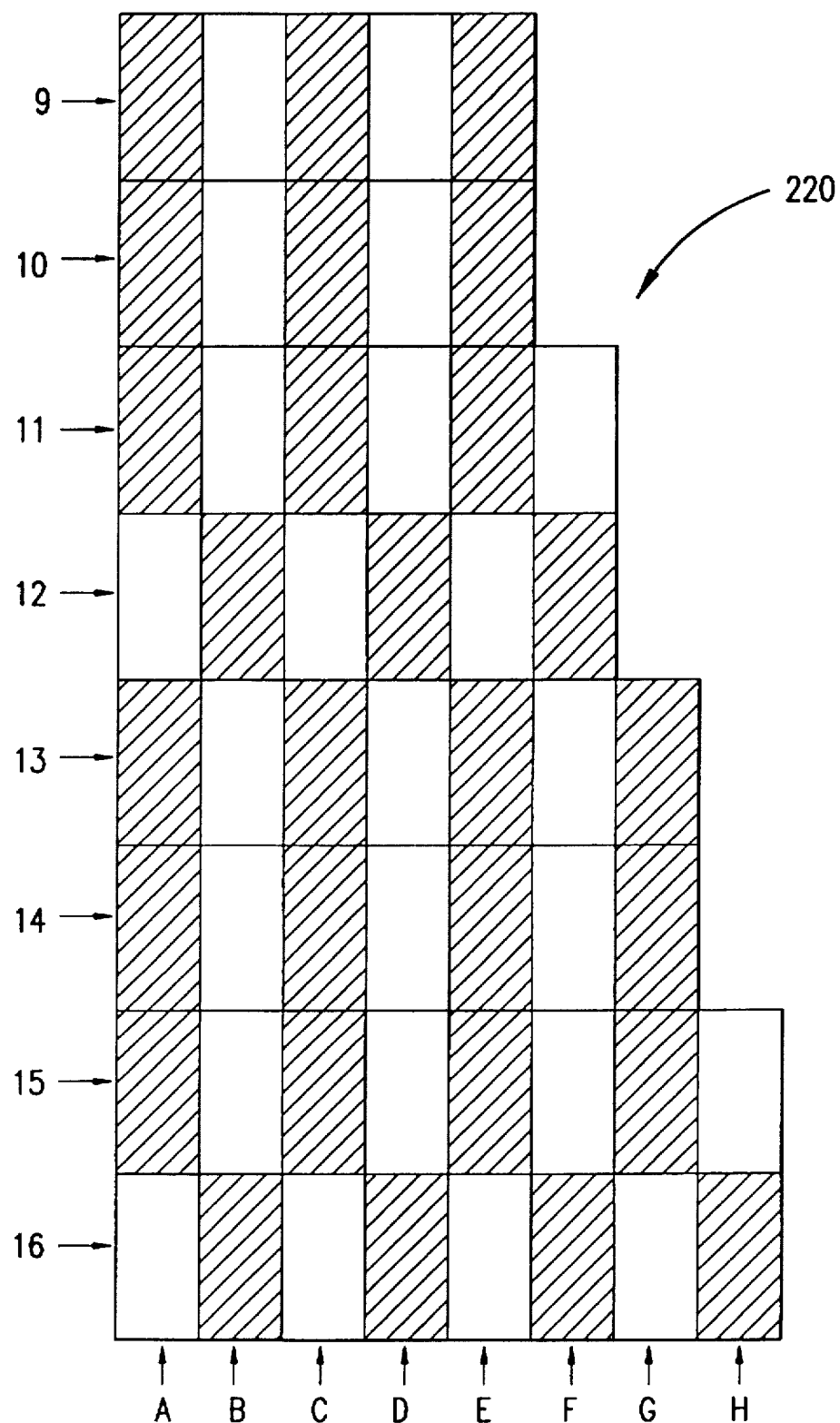
FIG. 5 is an altered pixel image according to an embodiment of the present invention.

FIG. 4 shows a flowchart describing an embodiment of the present invention that will be described with respect to FIGS. 5 and 6. Initially a pixel image 200 is received in the controller 50 in step 100. The image may be created from a scanning device, a ROS, a computer or other similar devices. For illustration purposes, the image that is received is the pixel image 200 shown in FIG. 1. In step 102, each of the pixel rows is appropriately numbered and labeled as either an odd or even row. For example, rows 9, 11, 13 and 15 correspond to odd-numbered rows while rows 10, 12, 14 and 16 correspond to even-numbered rows. While this embodiment will be described with respect to step 102 as labeling each of the rows as either odd or even, it is appreciated that this step may be part of other steps as other embodiments inherently determine which rows are odd and even by examining the rows in succession.

In step 104, the even-numbered pixels in each contiguous block of ON pixels are turned OFF for each of the odd rows 9, 11, 13 and 15. For example, in row 11, the pixels 11B, 11D and 11F are turned OFF. Further, in row 13 the pixels 13B, 13D and 13F are also turned OFF. Therefore, step 104 operates without respect to the right-hand edge unlike the method described in U.S. Pat. No. 5,270,728. In one embodiment, the left-most pixel 9A is first maintained ON. Then, the second pixel 9B is examined. If the pixel to its immediate left (9A) is maintained ON then the current pixel 9B is turned OFF. The third pixel 9C is then examined by looking at the pixel to its immediate left (9B). Because the pixel to the immediate left (9B) is OFF, the current pixel is maintained ON.

Thus, if the row is an odd-numbered row, operation proceeds from left to right (i.e., in the raster scan direction) to identify a current pixel as an ON pixel if and only if the pixel to the left of the current pixel is OFF. The pixel to the left may be OFF in the original bitmap or it may have been turned OFF during the previous step. Thus, a pixel from the original bitmap is not identified as an ON pixel unless the pixel to its immediate left is OFF.

In step 106, the even-numbered pixels for each of the even rows 10, 12, 14 and 16 are turned OFF starting from the right-most ON pixel in each contiguous block of ON pixels. For example, the pixel 12F is the right-most ON pixel of a block of contiguous ON pixels in pixel row 12. Accordingly, pixel 12E, 12C and 12A are turned OFF for pixel row 12. In pixel row 14, pixel 14G is the right-most pixel and accordingly pixels 14F, 14D and 14B are turned OFF. Therefore, each pixel corresponding to the right edge (in an even-numbered row) is maintained ON without regard to the left-hand edge of the respective pixel row.

Thus, if the row is an even-numbered row, operation proceeds from right to left (opposite to the raster scan direction) to identify a current pixel as an ON pixel if and only if the pixel to the right of the current pixel is OFF. The pixel to the right may be OFF from the original bitmap or it may have been turned OFF during the previous step. Thus, a pixel from the original bitmap is not identified as an ON pixel unless the pixel to its immediate right is OFF.

Finally, in step 108, the remaining ON pixels within the altered image 220 are appropriately printed using the printhead 22 having a lesser resolution than that of the original pixel image 200. Preferably, the printhead has a 300 dpi resolution while the pixel image 200 is a 300 dpi×600 dpi image.

Figure 6:
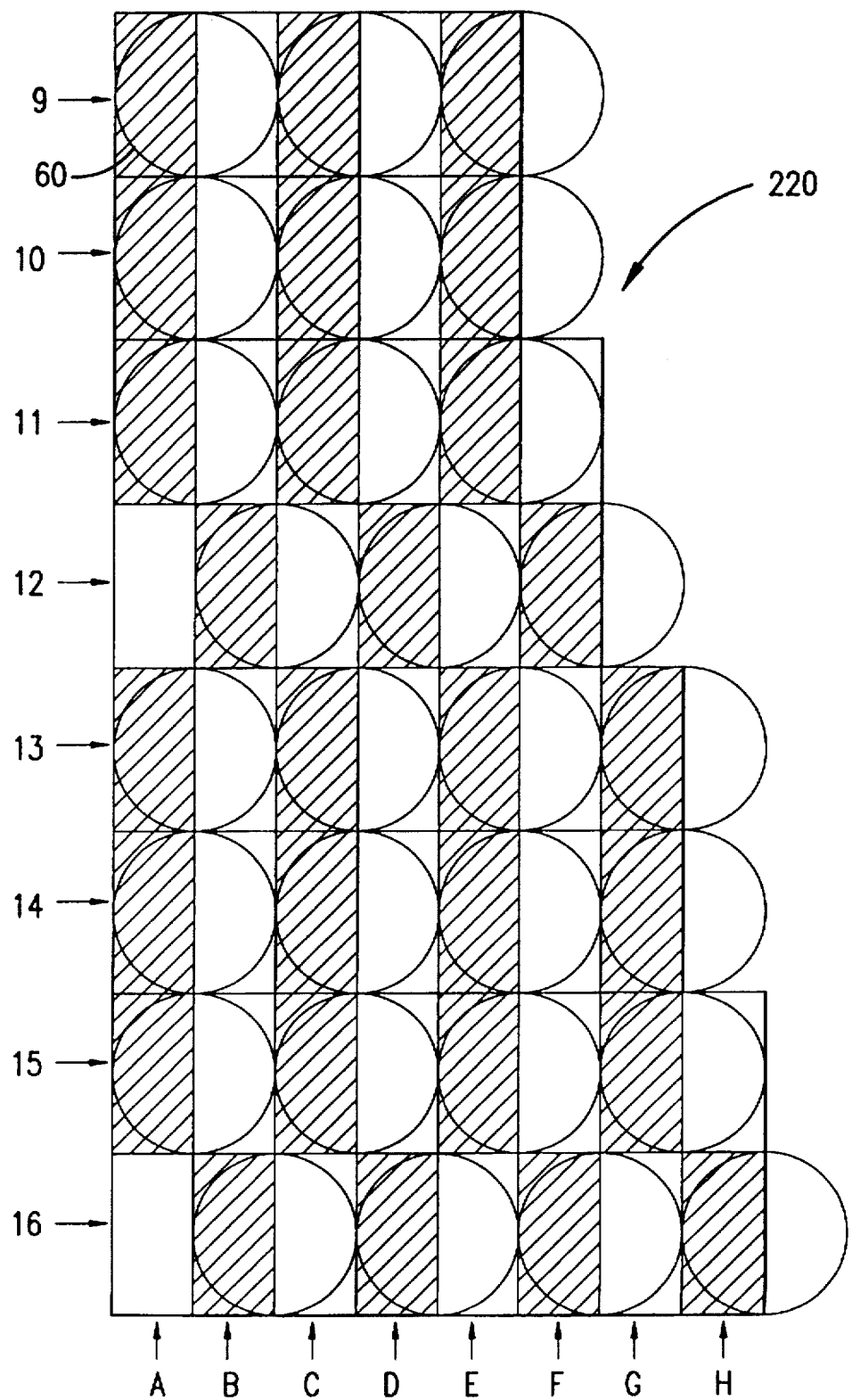
FIG. 6 is an embodiment of mapped pixels corresponding to ink drops in embodiments of the present invention.

FIG. 6 shows each remaining ON pixel in the altered image 220 being mapped to a dot 60 corresponding to a 300 dpi ink droplet. For example, each ON pixel of the altered image 220 is mapped with an OFF pixel to its immediate right. Accordingly, the altered image 220 within the controller 50 is raster scanned so as to produce the dots 60 on the receiving medium 28 so as to visibly reproduce the pixel image 200 at the printhead's resolution. The mapping can result in "enlarging" the image as the last dots in rows 9, 10, 12–14 and 16 extend beyond the end of the pixel row of the original pixel image 200.

Accordingly, the above-described method does not require as complicated an algorithm as that described in U.S. Pat. No. 5,270,728. Furthermore, the present invention avoids problems of the prior art that require the algorithm to always be sensitive to both the left and right hand edges (i.e., the edge proximity).

The above-described method is preferably carried out in the controller 50 by use of software on a host computer where the bits of each scan line are considered serially. That is, each of the odd-numbered rows is examined in a left-to-right manner while each of the even-numbered rows are examined in a right-to-left manner. In so doing, a state bit may be retained to record the state of the last pixel. Thus, if a white pixel is encountered, the state bit may be set to white. However, if a black pixel is encountered, the pixel is set to white if and only if the state variable is black. The state variable is then set to whatever the pixel was set to.

The invention may be practiced in software, as described above, or in hardware, as will be described below. An inkjet printer with a reciprocating printhead 22 normally has some number (typically 48 or more) of jets or channels that are configured in an orientation perpendicular to the direction of travel of the printhead 22. All of these jets or channels can fire essentially simultaneously to produce a vertical column of pixels at each location. In this way, as the printhead 22 traverses the width of the receiving medium 28, an entire swath of pixels is printed. Each swath is a set of pixels the width of the receiving medium 28 and the height of the printhead 22. Because firing of the jets or channels must be precisely timed, a dedicated memory buffer (also referred to as the swath buffer) is used within the controller 50 to store the image data for an entire swath prior to the traverse of the printhead 22 across the receiving medium 28. The invention operates on the data in the swath buffer prior to its transmission to the printhead 22.

Hardware operation can turn a pixel OFF if the previous pixel is ON. This operation is a logical AND with the complement of the previous pixel. Because of the bidirectional nature of the printhead 22, two or more passes are preferably made over the swath buffer, with half of the passes being in the left to right direction, and the other half of the passes being in the right to left direction. Each pass treats some number (up to half) of the scanlines in the swath buffer in parallel. Preferably only two passes are needed, one in a left to right direction, processing the odd-numbered rows in parallel, and one in a right to left direction, processing the even-numbered rows in parallel. Embodiments in which a larger number of passes is used to process sub-sections of a swath are also within the scope of this invention.

Figure 8:
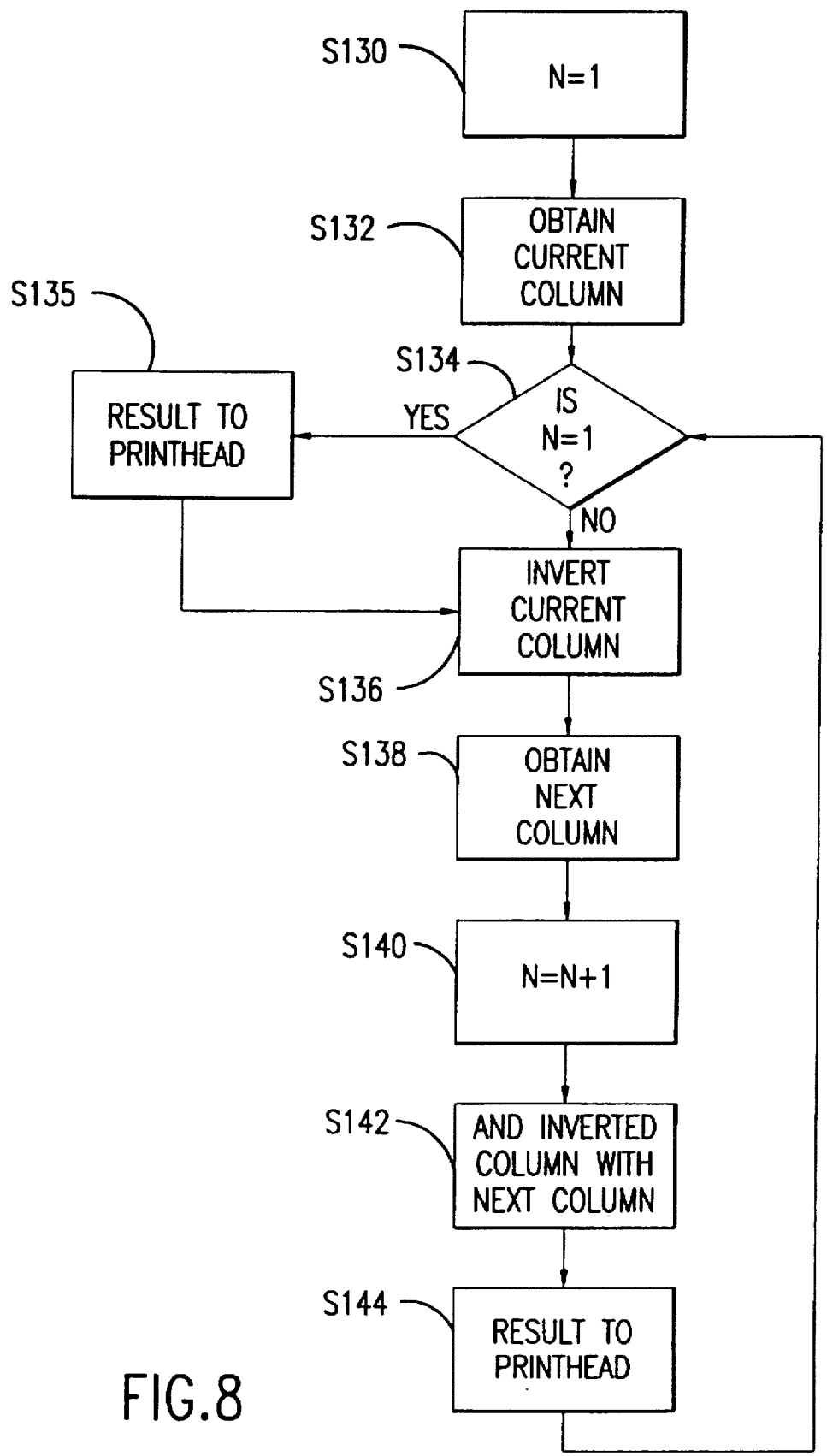
FIG. 8 is a flowchart describing an embodiment of the present invention for examining a swath of pixels.

A left to right pass is described with respect to FIG. 8. A counter N representative of the number of consecutive ON pixels is set to one in step 130. Thus, the counter N is not set to 1 until the first ON pixel (i.e., the leftmost) is encountered for a respective row. Further, each row is individually processed with respect to that respective row even though all of the odd-numbered rows are being processed simultaneously (i.e., in parallel). Thus, each row will include its own counter N. However, for ease of illustration, the processing will be described with respect to one counter N. In step 132, a current column is input as the leftmost column in the swath for the odd-numbered rows. In step 134, a decision is made whether the current column is the leftmost in the swath based on the counter N. If so, then the current column is printed by the printhead 22 in step 135. The current column is logically inverted in step 136. The NEXT column in the swath for the odd-numbered rows is then obtained in step 138 and the counter N is incremented in step 140. In step 142, a logical AND occurs between the inverted scan column (from step 136) and the next column (from step 138). The logical AND result is sent to the printhead 22 in step 144. Operation continues by returning to step 134.

A right to left pass occurs in a similar manner to that of FIG. 8. However, in a right to left pass, the current column that is input in step 132 is the rightmost column in the swath for the even-numbered rows. Step 134 decides whether the current column is the rightmost ON pixel in the swath. Operation continues in a similar manner except the NEXT column in step 133 proceeds in a right to left manner.

While the invention has been described in relation to preferred embodiments, many modifications and variations are apparent from the description of the invention, and all such modifications and variations are intended to be within the scope of the present invention as defined in the appended claims.

What is claimed is:

1. A method of printing an image having a defined resolution along an axis using an ink jet printer having a predetermined resolution along the axis less than the defined resolution of the image, the image comprising a first pixel row of at least four consecutively numbered ON pixels extending along the axis from a first left edge pixel to a first right edge pixel and a second pixel row of at least four consecutively numbered ON pixels extending along the axis from a second right edge pixel to a second left edge pixel, the method comprising the steps of:

receiving the image having the defined resolution along the axis;

turning OFF even numbered pixels from the first pixel row starting with the first left edge pixel and proceeding toward the first right edge pixel;

turning OFF even numbered pixels from the second pixel row starting with the second right edge pixel and proceeding toward the second left edge pixel;

after the turning OFF steps, firing ink drops from the ink jet printer at areas corresponding to remaining ON pixels in the first pixel row and remaining ON pixels in the second pixel row, the fired ink drops visibly reproducing the image at the defined resolution along the axis.

2. The method of claim 1, further comprising the step of defining the first pixel row and the second pixel row to each comprise at least four pixels.

3. The method of claim 1, further comprising the step of setting the defined resolution along the axis to be approximately 600 dots per inch and the predetermined resolution along the given axis to be approximately 300 dots per inch.

4. The method of claim 1, wherein the receiving step comprises receiving the image in a memory.

5. The method of claim 4, comprising the step of performing the turning OFF steps in a memory.

6. The method of claim 1, further comprising the steps of:
setting the image to further comprise a third pixel row having at least four consecutively numbered ON pixels extending along the axis from a corresponding left edge pixel to a corresponding right edge pixel,
turning OFF even numbered pixels from the third pixel row starting with the corresponding left edge pixel of the third pixel row and proceeding to the corresponding right edge pixel of the third pixel row; and
firing ink drops from the ink jet printer at areas corresponding to remaining ON pixels in said third pixel row.

7. The method of claim 6, further comprising the steps of:
setting the image to further comprise a fourth pixel row having at least four consecutively numbered ON pixels extending along the axis from a corresponding left edge pixel to a corresponding right edge pixel,
turning OFF even numbered pixels from the fourth pixel row starting with the corresponding left edge pixel of the fourth pixel row and proceeding to the corresponding right edge pixel of the fourth pixel row; and
firing ink drops from the ink jet printer at areas corresponding to remaining ON pixels in said fourth pixel row.

8. The method of claim 1, wherein the first pixel row turning OFF step comprises the steps of:
starting with the first left edge pixel in the first pixel row, determining whether a pixel to the immediate left of a current pixel being examined is ON, wherein the current pixel being examined is turned OFF when the pixel to the immediate left of the current pixel being examined is ON, said turned OFF pixel thereafter being an OFF pixel; and
repeating the determining step for each subsequent pixel of the first pixel row by examining a new current pixel.

9. The method of claim 1, wherein the second pixel row turning OFF step comprises the steps of:
starting with the second right pixel in the second pixel row, determining whether a pixel to the immediate right of a current pixel being examined is ON, wherein the current pixel being examined is turned OFF when the pixel to the immediate right of the current pixel being examined is ON, said turned OFF pixel thereafter being an OFF pixel; and
repeating the determining step for each subsequent pixel of the second pixel row by examining a new current pixel.

10. An ink jet printing method for use with an ink jet printer having a predetermined resolution along an axis extending in a first direction, the method comprising the steps of:

receiving a pixel image having a defined resolution along the axis, the pixel image comprising a first pixel row extending in the first direction from a first ON edge pixel to a second ON edge pixel and a second pixel row extending in a second direction opposite to the first direction from a third ON edge pixel to a fourth ON edge pixel, the first pixel row and the second pixel row each having at least four consecutive ON pixels;

altering the first pixel row by turning OFF pixels and by maintaining ON pixels starting with the first ON edge pixel and proceeding toward the second ON edge pixel, the altered first pixel row having no adjacent ON pixels and no adjacent OFF pixels, the first ON edge pixel maintained as one of the ON pixels;

subsequent to altering the first pixel row, altering the second pixel row by turning OFF pixels and by maintaining ON pixels starting with the third ON edge pixel and proceeding toward the fourth ON edge pixel, the altered second pixel row having no adjacent ON pixels and no adjacent OFF pixels, the third ON edge pixel maintained as one of the ON pixels; and raster scanning the altered first pixel row and the altered second pixel row with the ink jet printer to visibly reproduce the image at the defined resolution.

11. The method of claim 10, further comprising the step of altering subsequently odd-numbered pixel rows by turning OFF pixels and by maintaining ON pixels, each altered subsequently odd-numbered pixel row having no adjacent ON pixels and no adjacent OFF pixels.

12. The method of claim 11, further comprising the step of altering subsequently even-numbered pixel rows by turning OFF pixels and by maintaining ON pixels, each altered subsequently even-numbered pixel row having no adjacent ON pixels and no adjacent OFF pixels.

13. The method of claim 12, further comprising the step of raster scanning each altered subsequently odd-numbered pixel row and each altered subsequently even-numbered pixel row with the ink jet printer to visibly reproduce the image at the defined resolution.

14. The method of claim 10, wherein the first pixel row altering step comprises the step of selectively examining each pixel in the first pixel row, starting with the first ON edge pixel, to alternately label each pixel as one of an ON pixel and an OFF pixel, the labelling proceeding in the first direction, the first ON edge pixel being labeled as one of the ON pixels.

15. The method of claim 10, wherein the second pixel row altering step comprises the step of selectively examining each pixel in the second pixel row, starting with the third ON edge pixel to alternately label each pixel as one of an ON pixel and an OFF pixel, the labelling proceeding in the direction opposite to the first direction, the third ON edge pixel being labeled as one of the ON pixels.

16. An ink jet printing method comprising the steps of:
receiving a pixel image having a defined resolution along an axis extending in a first direction, the pixel image comprising a first pixel row extending in the first direction along the axis from a first edge pixel to a second edge pixel and a second pixel row extending in a second direction opposite to the first direction from a third edge pixel to a fourth edge pixel, the first pixel row and the second pixel row each having at least four consecutive ON pixels;

selectively examining each pixel in the first pixel row starting with the first edge pixel and proceeding toward the second edge pixel, to alternately label each pixel as one of an odd-numbered pixel and an even-numbered pixel, the first edge pixel being labeled as the odd-numbered pixel;

selectively examining each pixel in the second pixel row starting with the third edge pixel and proceeding toward the fourth edge pixel, to alternately label each pixel as one of an odd-numbered pixel and an even-numbered pixel, the third edge pixel being labeled as the odd-numbered pixel; and printing each pixel labeled as an odd-numbered pixel with an ink jet printer having a lesser resolution along the axis than the defined resolution to visibly reproduce the image at the defined resolution.

17. An ink jet printing method comprising the steps of:

receiving a pixel image having a defined resolution along an axis extending in a first direction, the pixel image comprising a first pixel row extending along the axis in the first direction from a first edge pixel to a second edge pixel and a second pixel row extending in a second direction opposite to the first direction from a third edge pixel to a fourth edge pixel, the first pixel row and the second pixel row each having at least four consecutive ON pixels;

altering the pixel image to produce an altered pixel image, the altering step comprising the steps of:

maintaining ON the first edge pixel of the first pixel row;

turning OFF pixels and maintaining ON pixels of the first pixel row, in consecutive order, from the first edge pixel to the second edge pixel, pixels being turned OFF only when an immediately previously examined pixel is maintained ON;

maintaining ON the third edge pixel of the second pixel row; and turning OFF pixels and maintaining ON pixels of the second pixel row, in consecutive order, from the third edge pixel to the fourth edge pixel, pixels of the second pixel row being turned OFF only when an immediately previously examined pixel is maintained ON, the altered pixel image being represented by the maintained ON pixels; and raster scanning the altered pixel image with an ink jet printer having a resolution less than the defined resolution to visibly reproduce the pixel image at the defined resolution.

18. A method of printing an image with an ink jet printer, the image having a resolution along an axis greater than a resolution of the ink jet printer, the method comprising the steps of:

receiving the image comprising a plurality of pixel rows each having at least four pixels extending from a first edge of the image to a second edge of the image;

altering a first pixel row beginning with the first edge and proceeding toward the second edge to produce an altered pixel row having no adjacent ON pixels and no adjacent OFF pixels, wherein the pixel corresponding to the first edge of the first pixel row is not altered during the first pixel row altering step;

altering a second pixel row beginning with the second edge and proceeding toward the first edge to produce an altered second pixel row having no adjacent ON pixels and no adjacent OFF pixels, wherein the pixel corresponding to the second edge of the second pixel row is not altered during the second pixel row altering step; and printing the altered first pixel row and the altered second pixel row with the ink jet printer to visibly reproduce the image at the resolution of the image.

19. The method of claim 18, wherein the first pixel row altering step further comprises the step of alternately maintaining ON pixels and turning OFF pixels of the first pixel row, in consecutive order, from the first edge to the second edge, the altered pixel image being represented by the maintained ON pixels.

20. The method of claim 19, wherein the second pixel row altering step further comprises the step of alternately maintaining ON pixels and turning OFF pixels of the second pixel row, in consecutive order, from the second edge to the first edge.

* * * * *